United States Patent
Vrazic (10) Patent No.: US 9,245,516 B2
(45) Date of Patent: Jan. 26, 2016

(54) NOISE REMOVAL DEVICE

(71) Applicant: AISIN SEIKI KABUSHIKI KAISHA, Kariya-shi, Aichi-ken (JP)

(72) Inventor: Sacha Vrazic, Munich (DE)

(73) Assignee: AISIN SEIKI KABUSHIKI KAISHA, Aichi-ken (JP)

( * ) Notice: Subject to any disclaimer, the term of this patent is extended or adjusted under 35 U.S.C. 154(b) by 223 days.

(21) Appl. No.: 14/032,483

(22) Filed: Sep. 20, 2013

(65) Prior Publication Data

US 2014/0079244 A1 Mar. 20, 2014

(30) Foreign Application Priority Data

Sep. 20, 2012 (JP) ................. 2012-206934

(51) Int. Cl.
| | | |
|---|---|---|
| H04B 15/00 | (2006.01) | |
| G10K 11/16 | (2006.01) | |
| H04L 25/03 | (2006.01) | |
| H04L 25/02 | (2006.01) | |

(52) U.S. Cl.
CPC ............ *G10K 11/16* (2013.01); *H04L 25/0222* (2013.01); *H04L 25/0307* (2013.01); *H04L 2025/03636* (2013.01); *H04L 2025/03649* (2013.01)

(58) Field of Classification Search
CPC ............................. H04R 3/005; G10L 21/0208
See application file for complete search history.

(56) References Cited

U.S. PATENT DOCUMENTS

| | | | | |
|---|---|---|---|---|
| 5,917,921 | A * | 6/1999 | Sasaki ................. | H04R 1/406 381/92 |
| 8,199,923 | B2 * | 6/2012 | Christoph .......... | G10K 11/1784 381/71.1 |
| 8,280,074 | B2 * | 10/2012 | Yamamoto ............. | H03F 3/217 330/10 |
| 8,775,171 | B2 * | 7/2014 | Sorensen ............. | G10L 19/012 379/392.01 |
| 2002/0051569 | A1 * | 5/2002 | Kita ............................ | 382/167 |
| 2004/0001599 | A1 | 1/2004 | Etter et al. | |
| 2004/0001621 | A1 * | 1/2004 | Kusakabe et al. ............. | 382/164 |
| 2006/0030287 | A1 | 2/2006 | Vanderhelm et al. | |
| 2008/0219376 | A1 * | 9/2008 | Qi et al. ....................... | 375/285 |
| 2010/0246851 | A1 | 9/2010 | Buck et al. | |
| 2010/0311463 | A1 | 12/2010 | Konchitsky et al. | |
| 2013/0120057 | A1 | 5/2013 | Vrazic et al. | |

FOREIGN PATENT DOCUMENTS

| | | |
|---|---|---|
| DE | 10202635 A1 | 8/2003 |
| EP | 2 237 270 A1 | 10/2010 |
| JP | 6-315259 A | 11/1994 |
| JP | 8-307797 A | 11/1996 |
| WO | 2005/091510 A1 | 9/2005 |

* cited by examiner

*Primary Examiner* — Simon Sing
(74) *Attorney, Agent, or Firm* — Sughrue Mion, PLLC (57) ABSTRACT

A noise removal device which removes noise included in a signal, includes: a statistical parameter calculation portion configured to calculate a parameter which expresses distribution of the noise based on the signal; and a noise removal portion configured to remove the noise from the signal by changing an element which relates to a process of removing the noise from the signal depending on the parameter which expresses the distribution of the noise.

3 Claims, 7 Drawing Sheets

NOISE REMOVAL DEVICE

CROSS REFERENCE TO RELATED APPLICATIONS

This application is based on and claims priority under 35 U.S.C. §119 to Japanese Patent Application 2012-206934, filed on Sep. 20, 2012, the entire content of which is incorporated herein by reference.

TECHNICAL FIELD

This disclosure relates to a device which performs noise removal on an audio signal (for example, a signal for reproducing sound, such as a musical signal or a voice signal).

BACKGROUND DISCUSSION

In recent years, facilities for pursuing the convenience or comfort of a user in a vehicle have dramatically increased. However, some of the facilities become noise sources for a musical signal of an audio system. For example, an inverter for connecting an AC device, such as a personal computer, to a vehicle or an inverter for a hybrid engine generates a large amount of noise. In addition, for example, a gadget, such as a wireless battery charger of a smart phone, generates noise in an AM band or an FM band. Therefore, it is necessary to perform noise removal for various types of noise in an audio system which is used in a vehicle.

In a noise removal process disclosed in US 2006-0030287A, as a technology for performing noise removal, noise removal is performed by performing an adaptive filtering process using a modulation signal which is received from an antenna (that is, a signal acquired by performing FM or AM modulation on an audio signal in order to enable wireless transmission) and a noise reference signal which is received from another antenna.

In addition, in a noise removal process disclosed in EP 2237270A, a noise reference signal is acquired by performing an adaptive filtering process on each of two audio signals, and noise removal is performed by performing the adaptive filtering process again using one of the two audio signals and the noise reference signal.

However, in the noise removal processes disclosed in US 2006-0030287A and EP 2237270A, the type of noise is not considered and it may be implicitly considered that Gaussian noise is supposed to be present. Therefore, when impulsive noise is included in a signal, there is a possibility that noise is not sufficiently removed or the calculation of noise removal does not converge. Therefore, it is difficult to mention that the technologies disclosed in US 2006-0030287A and EP 2237270A cope with removal of various types of noise.

SUMMARY

Thus, there is a need for a noise removal device which is not suspectable to the drawback mentioned above.

An embodiment disclosed here is directed to a noise removal device which removes noise included in a signal, including: a statistical parameter calculation portion configured to calculate a parameter which expresses distribution of the noise based on the signal; and a noise removal portion configured to remove the noise from the signal by changing an element which relates to a process of removing the noise from the signal depending on the parameter which expresses the distribution of the noise.

According to the noise removal device of the embodiment disclosed here, it is possible to remove various types of noise including impulsive noise.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment disclosed here will be described with reference to the accompanying drawings. However, the embodiment disclosed here is not limited thereto. Meanwhile, the same reference numerals are assigned to components having the same functions in the drawings below and the descriptions thereof are not repeated.

Embodiment

Figure 1:
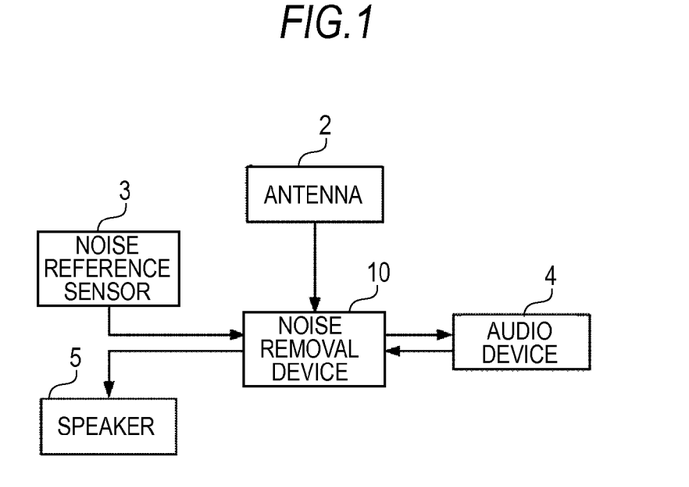
FIG. 1 is a schematic diagram illustrating the device configuration of an audio system according to an embodiment disclosed here.

FIG. 1 is a schematic diagram illustrating the device configuration of an audio system 1 according to an embodiment disclosed here. The audio system 1 includes an antenna 2 which receives a modulation signal from the outside, a noise reference sensor 3 which acquires a noise reference signal from a noise source, an audio device 4 which demodulates the modulation signal and outputs an audio signal, and a speaker 5 which generates music or voice from the audio signal. Further, the audio system 1 includes a noise removal device 10 which performs noise removal on the modulation signal and the audio signal. The noise removal device 10 is connected to the antenna 2, the noise reference sensor 3, the audio device 4 and the speaker 5, and performs a noise removal process on each of the modulation signal and the audio signal while relaying the modulation signal and the audio signal.

The antenna 2 is an antenna which receives the modulation signal acquired through modulation of the audio signal. The antenna 2 is connected to the noise removal device 10 via wiring, and the modulation signal which is received by the antenna 2 is propagated to the noise removal device 10 via the wiring.

It is possible to use an arbitrary antenna, such as an FM antenna or an AM antenna, corresponding to the modulation signal which is received in the audio system 1 as the antenna 2.

The noise reference sensor 3 is a sensor which is close to or arranged in the vicinity of a noise source that contaminates the modulation signal and which acquires noise from the noise source. The noise reference sensor 3 is connected to the noise removal device 10 via the wiring, and noise which is acquired by the noise reference sensor 3 is propagated to the noise removal device 10 as a noise reference signal via the wiring.

When there is a plurality of noise sources, it is possible to provide a plurality of noise reference sensors 3 which corresponds to the number of a plurality of noise sources. In this case, each of the plurality of noise reference sensors 3 is close to or arranged in the vicinity of each of the noise sources, and is connected to the noise removal device 10 via the wiring.

It is possible to use an arbitrary sensor, such as a current transformer or a Hall element, which corresponds to the noise source as the noise reference sensor 3.

The audio device 4 is an audio device which converts the modulation signal, from which noise is removed by the noise removal device 10, into an audio signal through demodulation and which outputs the audio signal to the noise removal device 10 again. That is, the audio device 4 operates as a demodulator. The audio device 4 is connected to the noise removal device 10 via two pieces of wiring. The audio device 4 receives the modulation signal from the noise removal device 10 via one piece of wiring, and transmits the audio signal to the noise removal device 10 via the other wiring.

It is possible to use an arbitrary audio device, such as an FM radio receiver or an AM radio receiver, corresponding to the modulation signal which is received in the audio system 1, as the audio device 4.

The speaker 5 is an arbitrary speaker which generates sound, such as music or voice that is the source of the audio signal, based on the audio signal. The speaker 5 is connected to the noise removal device 10 via wiring, and receives the audio signal, from which noise is removed, from the noise removal device 10 via the wiring. An amplifier which amplifies the audio signal may be provided between the noise removal device 10 and the speaker 5.

Figure 2:
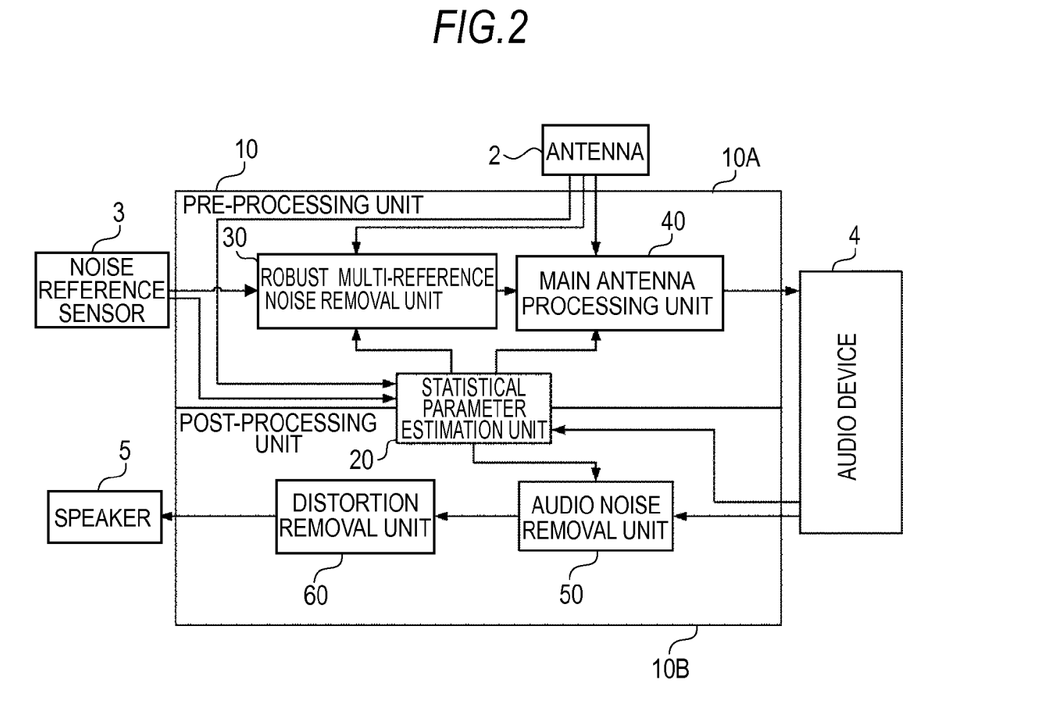
FIG. 2 is a functional block diagram illustrating functions of a noise removal device according to the embodiment disclosed here.

The noise removal device 10 is a device which performs noise removal on each of the modulation signal and the audio signal. FIG. 2 is a functional block diagram illustrating functions included in the noise removal device 10. The noise removal device 10 includes a pre-processing unit 10A which performs noise removal on the modulation signal received by the antenna 2, and a post-processing unit 10B which performs noise removal on the audio signal acquired in such a way that the audio device 4 demodulates the modulation signal.

The pre-processing unit 10A and the post-processing unit 10B share a statistical parameter estimation unit 20 which calculates statistical parameters that express the properties of noise using the modulation signal received by the antenna 2 or the audio signal demodulated by the audio device 4 and the noise reference signal acquired by the noise reference sensor 3.

Here, statistical parameter estimation is the calculation of the statistical parameters that express the statistical properties of noise using the modulation signal received by the antenna 2 or the audio signal demodulated by the audio device 4 and the noise reference signal acquired by the noise reference sensor 3.

The pre-processing unit 10A includes a robust multi-reference noise removal unit 30 that performs noise removal on the modulation signal using the modulation signal received by the antenna 2, the noise reference signal acquired by the noise reference sensor 3, and the statistical parameters calculated by the statistical parameter estimation unit 20.

Here, a robust multi-reference noise removal method is, namely, a robust noise removal method which selects a noise removal method with reference to a plurality of statistical parameters and which is capable of corresponding to various types of noise including impulsive noise using the statistical parameters for a noise removal process.

Further, the pre-processing unit 10A includes a main antenna processing unit 40 which performs noise removal corresponding to the modulation signal using the modulation signal received by the antenna 2 and the statistical parameters calculated by the statistical parameter estimation unit 20 when the robust multi-reference noise removal is not performed (for example, when the noise reference sensor 3 is not provided).

Here, the main antenna process is a noise removal process which is performed using the modulation signal from the antenna 2 and the statistical parameters calculated only from the modulation signal when the noise reference signal is not provided.

In the embodiment, although the pre-processing unit 10A uses the modulation signal received by the antenna 2 as a target of noise removal, the noise removal may be performed after the modulation signal is converted into an intermediate frequency signal. Even in this case, the same noise removal process as in the embodiment is applied.

The post-processing unit 10B includes an audio noise removal unit 50 which performs noise removal on the audio signal using the audio signal demodulated by the audio device 4 and the statistical parameters calculated by the statistical parameter estimation unit 20.

Further, the post-processing unit 10B includes a distortion removal unit 60 which performs distortion removal on the audio signal.

Figure 3:
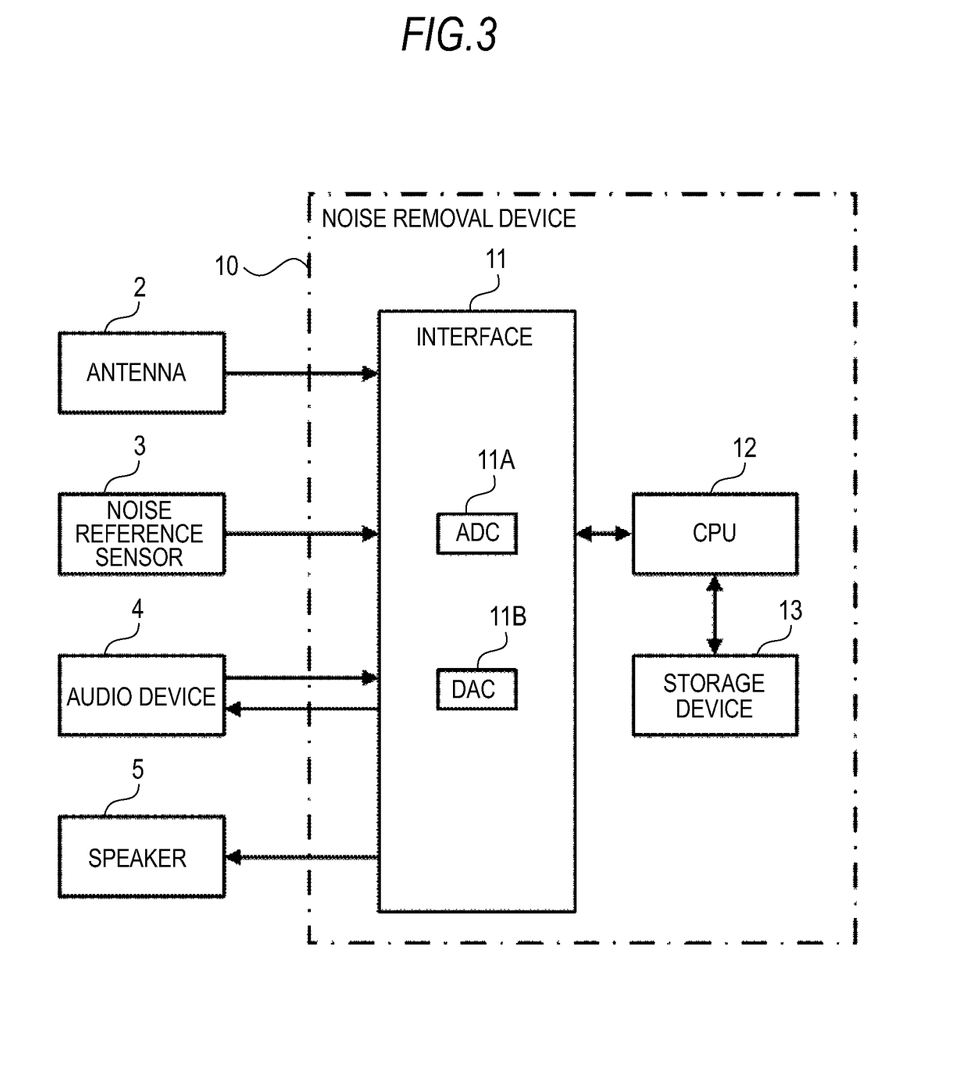
FIG. 3 is a schematic diagram illustrating the device configuration of the noise removal device according to the embodiment disclosed here.

FIG. 3 is a schematic diagram illustrating the device configuration of the noise removal device 10. The noise removal device 10 includes an interface 11, a CPU 12, and a storage device 13.

The interface 11 is connected to the antenna 2, the noise reference sensor 3, the audio device 4 and the speaker 5 via the wiring, and transmits and receives a signal to and from them. An Analog-Digital Converter (ADC) 11A is provided in the middle of the wiring to receive a signal from the outside to the noise removal device 10, and a Digital-Analog Converter (DAC) 11B is provided in the middle of the wiring to transmit a signal from the noise removal device 10 to the outside.

The storage device 13 includes an arbitrary storage device, such as a ROM, a RAM, or a hard disk drive. In addition, the storage device 13 may include a transportable storage medium, such as a CD-ROM or a flash memory. Each of the functions included in the noise removal device 10, that is, each of the statistical parameter estimation unit 20, the robust multi-reference noise removal unit 30, the main antenna processing unit 40, the audio noise removal unit 50, and the distortion removal unit 60 is stored in the storage device 13 in the form of a program. The CPU 12 reads a program which is stored in the storage device 13, and executes various kinds of process operations, such as calculations, controls, and determinations, depending on the program.

In the embodiment, although all the functions of the noise removal device 10 are implemented on a single device (that is, a set of the interface 11, the CPU 12 and the storage device 13), each function may be implemented in an individual process device or in an electronic circuit.

In the embodiment, although the noise removal device 10 is configured to be independent from the audio device 4, the noise removal device 10 may be configured to be embedded in or integrated with the audio device 4. In this case, the CPU 12 and the storage device 13 may be shared between the audio device 4 and the noise removal device 10.

Figure 4:
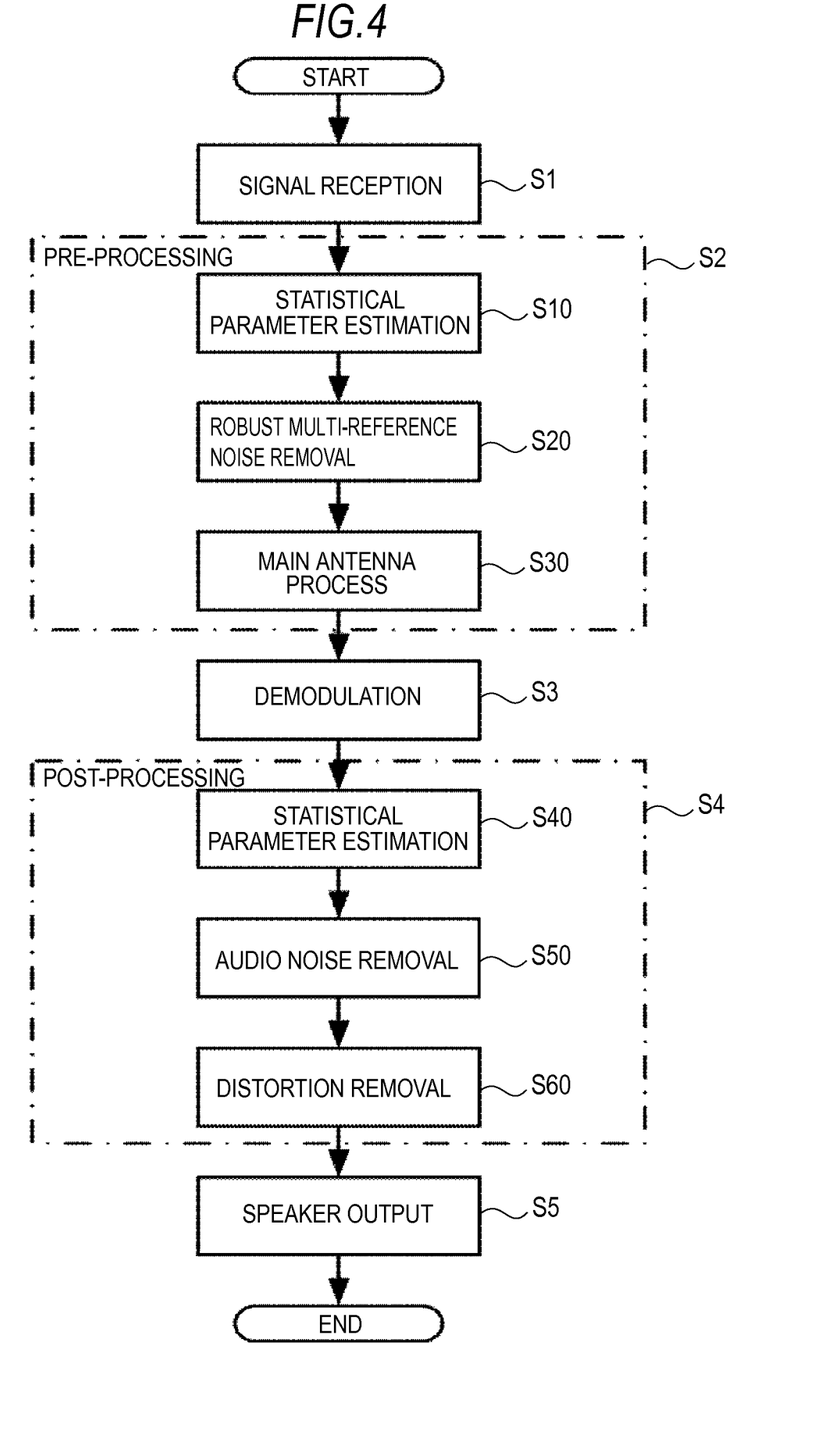
FIG. 4 is a flowchart illustrating a whole noise removal process according to the embodiment disclosed here.

FIG. 4 is a flowchart illustrating the entire noise removal process according to the embodiment.

First, the antenna 2 receives a modulation signal in step S1. The modulation signal is input to the noise removal device 10.

Subsequently, as pre-processing, the noise removal device 10 performs noise removal on the modulation signal received by the antenna 2 in step S2. The pre-processing includes statistical parameter estimation in step S10, robust multi-reference noise removal in step S20, and a main antenna process in step S30.

When the pre-processing ends, the noise removal device 10 outputs the modulation signal, from which noise is removed, to the audio device 4, and the audio device 4 demodulates the modulation signal and uses the demodulated signal as the audio signal in step S3. The audio signal is input to the noise removal device 10.

Subsequently, as post-processing, the noise removal device 10 performs noise removal on the audio signal demodulated by the audio device 4 in step S4. The post-processing includes statistical parameter estimation in step S40, audio noise removal in step S50, and distortion removal in step S60.

When the post-processing ends, the noise removal device 10 outputs the audio signal, from which noise is removed, to the speaker 5, and the speaker 5 generates music or voice based on the audio signal in step S5.

Hereinafter, each of the processes included in the noise removal process according to the embodiment will be described in detail.

Statistical Parameter Estimation

Appropriate noise removal methods differ depending on the type of noise which contaminates a signal. In the noise removal device according to the embodiment, an appropriate noise removal method is selected depending on the type of noise using statistical parameters which express the statistical properties of noise, and thus it is possible to perform, namely, a robust noise removal process which can correspond to various types of environments.

The statistical parameter estimation unit 20 calculates statistical parameters using the modulation signal received by the antenna 2, the audio signal demodulated by the audio device 4, and the noise reference signal acquired by the noise reference sensor 3. The statistical parameters include a parameter which expresses the correlation (coherence) between a signal and noise, a parameter $\alpha$ which expresses the distribution of noise, and a parameter which expresses the stationarity of noise.

Figure 5:
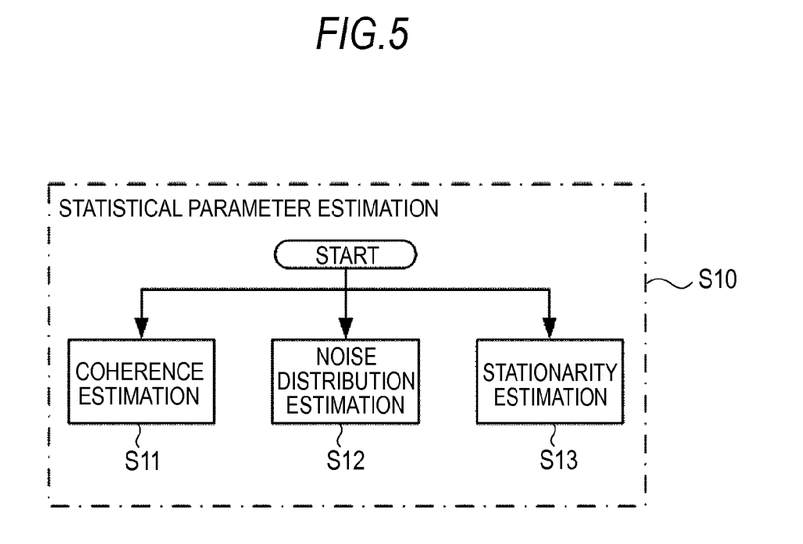
FIG. 5 is a flowchart illustrating statistical parameter estimation according to the embodiment disclosed here.

FIG. 5 is a flowchart illustrating the statistical parameter estimation in step S10 according to the embodiment. The statistical parameter estimation unit 20 performs coherence estimation for calculating the parameter which expresses coherence in step S11, noise distribution estimation for calculating the parameter $\alpha$ which expresses the distribution of noise in step S12, and stationarity estimation for calculating the parameter which expresses the stationarity of noise in step S13.

Since each of the coherence estimation, the noise distribution estimation, and the stationarity estimation is an independent process, it is possible to perform the estimations in parallel and it is possible to perform only a part of the estimations if necessary.

Coherence Estimation

The content of a process of the coherence estimation in step S11 according to the embodiment will be described below.

If the noise removal process is performed, the quality of the audio signal is deteriorated in any way, and thus it is preferable that the noise removal process be not performed if not necessary. An adaptive filter which is used in the embodiment is a linear filter. Therefore, if linear transferring is performed between the modulation signal and the noise reference signal, the adaptive filter may be used. However, if not, it is not possible to use the adaptive filter.

In the embodiment, it is determined whether or not the noise removal process is necessary by evaluating the coherence between the modulation signal and the noise reference signal, that is, the existence of linear transferring. Therefore, an unnecessary noise removal process is not performed, and thus it is possible to reduce the deterioration in the quality of the audio signal.

The parameter which expresses coherence (hereinafter, simply referred to as coherence) is a linear transferring index between the modulation signal and the noise reference signal. In the embodiment, the coherence is derived using the following Expression (1).

$$\text{Coherence}_k = \frac{|S_{ar,k}(f)|^2}{S_{aa,k}(f) S_{rr,k}(f)} \quad (1)$$

Coherence$_k$ is coherence at a time point of k. $S_{ar,k}(f)$ is the cross power spectral density between a modulation signal a and a noise reference signal r at the time point of k. $S_{aa,k}(f)$ is the power spectral density of the modulation signal a at the time point of k. $S_{rr,k}(f)$ is the power spectral density of the noise reference signal r at the time point of k. The power spectral density expresses the distribution of the intensity (electric power) of a signal for a frequency f. Meanwhile, the power spectral density is symmetrical to the origin (for example, $S_{aa,k}(f) = S_{aa,k}(-f)$).

A well-known technique may be used for calculation of the power spectral density. More specifically, it is possible to acquire the power spectral density using a method below. First, the statistical parameter estimation unit 20 multiplies each of the modulation signal and the noise reference signal by a window function (for example, a Hanning window function), and performs Fast Fourier Transform (FFT) on each of the modulation signal and the noise reference signal. Thereafter, the statistical parameter estimation unit 20 acquires $S_{aa,k}(f)$ by obtaining the product of the modulation signal on which the FFT is performed and the complex conjugate of the modulation signal on which the FFT is performed. In addition, the statistical parameter estimation unit 20 acquires $S_{rr,k}(f)$ by obtaining the product of the noise reference signal on which the FFT is performed and the complex conjugate of the noise reference signal on which the FFT is performed. Further, the statistical parameter estimation unit 20 acquires $S_{ar,k}(f)$ by obtaining the product of the modulation signal on which the FFT is performed and the complex conjugate of the noise reference signal on which the FFT is performed.

The statistical parameter estimation unit 20 calculates the coherence$_k$ by substituting $S_{aa,k}(f)$, $S_{rr,k}(f)$, and $S_{ar,k}(f)$ into Expression (1).

The coherence includes values from 0 to 1. If the coherence is greater than a predetermined threshold (for example, 0.4), it is possible to determine that there is linear transferring between the modulation signal and the noise reference signal. If not, it is possible to determine that there is no linear transferring. If there is linear transferring, it is possible to perform an adaptive filtering process.

There is a case in which linear transferring appears in only a specific frequency area and does not appear in the other frequency areas. In the specification, the state is referred to as a state where there is partial coherence. In this case, it is preferable that the adaptive filtering process be performed in only the frequency area where linear transferring appears.

When a plurality of noise reference sensors 3 is provided, the coherences of noise reference signals from the respective noise reference sensors 3 are calculated (that is, a number of coherences corresponding to the number of noise reference sensors 3 are calculated).

Noise Distribution Estimation

The content of a process of the noise distribution estimation in step S12 according to the embodiment will be described below. In a noise removal process using an adaptive filter in the related art, Gaussian distribution is supposed for noise distribution in many cases. However, when a large amount of impulsive noise is included in noise, noise distribution has an alpha-stable distribution. In the alpha-stable distribution, dispersion is infinite, and thus there is a problem in that the adaptive filter in the related art using a second moment (dispersion) does not converge. In the embodiment, the parameter α which expresses the distribution of noise is used to select an appropriate noise removal method (for example, the kind of an adaptive filter) and is used for noise removal calculation, and thus it is possible to solve the problem of convergence, thereby sufficiently removing the impulsive noise.

It is known that the alpha-stable distribution is characterized by four parameters. However, in the specification, the parameter α which provides an impulsive level is used from among the four parameters. When the parameter α is small, the impulsive property of noise is large.

When α=2, noise has a Gaussian distribution. When α<2, noise has the impulsive property and noise has the alpha-stable distribution. At this time, it is not possible to define the second moment (dispersion). Further, when α<1, it is not possible to define a first moment (average).

It is possible to acquire the parameter α using a well-known method. It is possible to calculate the parameter α from the modulation signal received by the antenna 2 or from the noise reference signal acquired by the noise reference sensor 3. Since it is possible to more precisely estimate noise distribution when the parameter α is calculated from the noise reference signal, it is preferable to calculate the parameter α from the noise reference signal.

A method of calculating the parameter α in the embodiment will be described below. The calculation method is an example, and the parameter α may be calculated using another arbitrary method.

The statistical parameter estimation unit 20 divides a noise reference signal frame having a length N into L sub-frames each having a length M at the time point of k. That is, ML=N. The statistical parameter estimation unit 20 acquires the maximum value and the minimum value of the amplitude of an l-th sub-frame (l=1 to L) using Expression (2).

$$X\max_{l,k} = \log[\max(x)]$$

$$X\min_{l,k} = -\log[-\min(x)] \quad (2)$$

x is the amplitude of the noise reference signal of each sub-frame. $X\max_{l,k}$ is the maximum value of amplitude in the l-th sub-frame at the time point of k. $X\min_{l,k}$ is the minimum value of the amplitude in the l-th sub-frame at the time point of k.

The statistical parameter estimation unit 20 acquires α using Expression (3) after acquiring the maximum values and the minimum values of the amplitudes of all the sub-frames.

$$\alpha_k = \frac{\pi}{2\sqrt{6}} \left[ \frac{1}{\sqrt{\frac{1}{L-1}\sum_l (X\max_{l,k} - \overline{X\max_k})^2}} + \frac{1}{\sqrt{\frac{1}{L-1}\sum_l (X\min_{l,k} - \overline{X\min_k})^2}} \right] \quad (3)$$

$$\overline{X\max_k} = \frac{1}{L}\sum_l X\max_{l,k}$$

$$\overline{X\min_k} = \frac{1}{L}\sum_l X\min_{l,k}$$

$\alpha_k$ is the parameter α which expresses the distribution of noise at the time point of k. When a plurality of noise reference sensors 3 is provided, α is calculated for the respective noise reference signals from each of the noise reference sensors 3. The estimation is more accurate because a plurality of α is used.

Stationarity Estimation

The content of a process of the stationarity estimation in step S13 according to the embodiment will be described below.

It is possible to perform classification on noise based on the manner of change of the noise. Stationary noise includes a statistical value that is a constant under an ergodicity assumption in that the moment thereof (that is, average or dispersion) does not depend on time and the moment is the same with regard to the course of time. Cyclostationary noise includes a statistical value that is periodically repeated. For example, the circulating stationary noise is generated when impulsive noise from an inverter contaminates a signal. In the specification, the circulating stationary noise is treated as the stationary noise. Non-stationary noise includes a moment which (slowly or rapidly) changes with time.

The adaptive filter in the related art includes an adaptive filter in which time is necessary to converge, and thus it is not possible to use such an adaptive filter for non-stationary noise (it is not possible to converge). In the embodiment, a parameter which expresses stationarity is calculated, and an adaptive filter which is designed to be capable of following fast variation is used in a case of non-stationary noise, thereby corresponding to non-stationary noise.

The parameter which expresses stationarity according to the embodiment is calculated as below. First, the statistical parameter estimation unit 20 divides the noise reference signal frame having a length N into the L sub-frames each having a length of M. That is, ML=N. Subsequently, the statistical parameter estimation unit 20 calculates the averages and the dispersions of the respective sub-frames. Thereafter, the statistical parameter estimation unit 20 compares the averages and the dispersions of the respective sub-frames with each other. When the difference therebetween is equal to or less than a predetermined percentage (for example, within a range from −10% to +10%), it is determined that noise which contaminates the modulation signal of the frame is stationary noise. Otherwise, it is determined that the noise is non-stationary noise. For example, in the case of stationary noise, 0 is output as a stationary parameter. Otherwise, 1 is output.

The parameter which expresses stationarity is not limited to the parameter which has been described here, and it is possible to use an arbitrary parameter if the parameter is an index of noise stationarity.

Robust Multi-Reference Noise Removal

The robust multi-reference noise removal unit 30 selects and executes the appropriate noise removal method based on the statistical parameters calculated by the statistical parameter estimation unit 20. Therefore, it is possible to select a noise removal method which is available for the type of noise included in a signal, and thus it is possible to improve noise removal efficiency. In addition, the noise removal method in which process time is necessary (that is, calculation cost is high) is performed only if necessary. Therefore, it is possible to reduce process time, compared to a case in which there is fixed usage of the noise removal method in which process time is necessary. Further, it is possible to perform noise removal on only a signal which has coherence with noise or on a part of the frequency area of the signal, and thus it is possible to reduce deterioration in the signal due to the noise removal process.

When the noise reference sensor 3 is not provided, the robust multi-reference noise removal in step S20 is not performed, and the process proceeds to the main antenna process in step S30. In addition, when the noise reference sensor 3 is not provided, the robust multi-reference noise removal unit 30 in itself may not be provided.

Figure 6:
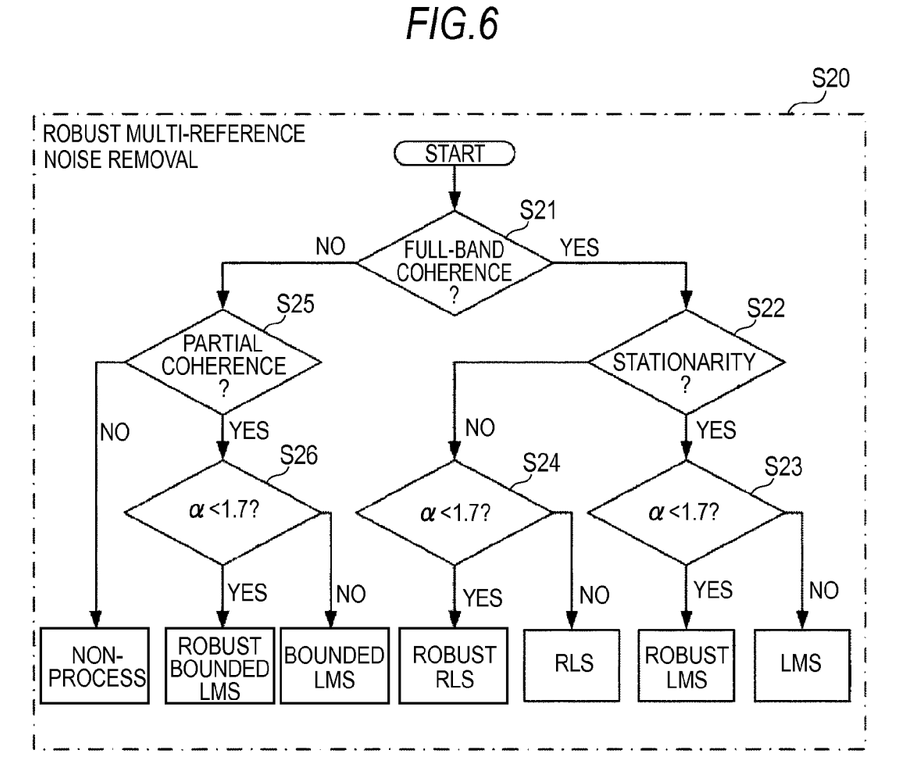
FIG. 6 is a flowchart illustrating robust multi-reference noise removal according to the embodiment disclosed here.

FIG. 6 is a flowchart illustrating the robust multi-reference noise removal in step S20 according to the embodiment. First, the robust multi-reference noise removal unit 30 determines whether or not there is full-band coherence based on the parameter which expresses coherence included in the statistical parameters acquired by the statistical parameter estimation unit 20 in step S21. More specifically, if the above-described value of coherence is greater than a predetermined threshold (for example, 0.4) in the full-band of the signal, it is determined that there is full-band coherence. Otherwise, it is determined that there is no full-band coherence.

If it is determined that there is full-band coherence in step S21, the robust multi-reference noise removal unit 30 determines whether or not there is stationarity based on the parameter which expresses stationarity included in the statistical parameters acquired by the statistical parameter estimation unit 20 in step S22. More specifically, if the above-described parameter which expresses stationarity is a predetermined value (for example, 0), it is determined that there is stationarity. Otherwise, it is determined that there is no stationarity.

When it is determined that there is stationarity in step S22, the robust multi-reference noise removal unit 30 determines the kind of an adaptive filter to be used based on the parameter $\alpha$ which expresses the distribution of noise that is included in the statistical parameters acquired by the statistical parameter estimation unit 20 in step S23. More specifically, when $\alpha$ is equal to or greater than 1.7, it is determined that a Least Mean Square (LMS) is used. When $\alpha$ is less than 1.7, it is determined that a Robust LMS is used.

When it is determined that there is no stationarity in step S22, the robust multi-reference noise removal unit 30 determines the kind of the adaptive filter to be used based on the parameter $\alpha$ which expresses the distribution of noise in step S24. More specifically, when $\alpha$ is equal to or greater than 1.7, it is determined that a Recursive Least Square (RLS) is used. When $\alpha$ is less than 1.7, it is determined that a Robust RLS is used.

When it is determined that there is no full-band coherence in step S21, the robust multi-reference noise removal unit 30 determines whether or not there is partial coherence based on the parameter which expresses coherence in step S25. More specifically, if the above-described value of coherence is greater than a predetermined threshold (for example, 0.4) in a part of the frequency area of the signal, it is determined that there is partial coherence. Otherwise, it is determined that there is no partial coherence.

When it is determined that there is partial coherence in step S25, the robust multi-reference noise removal unit 30 determines the kind of an adaptive filter to be used based on the parameter $\alpha$ which expresses the distribution of noise in step S26. More specifically, when $\alpha$ is equal to or greater than 1.7, it is determined that a Bounded LMS is used. When $\alpha$ is less than 1.7, it is determined that a Robust Bounded LMS is used.

When it is determined that there is no partial coherence in step S25, the robust multi-reference noise removal unit 30 does not perform the noise removal process using the adaptive filter in the robust multi-reference noise removal, and the process proceeds to a main antenna process which will be described later.

In the embodiment, the determination of the parameter $\alpha$ is on the basis of 1.7. The reason for this is that it is assumed that noise is close to a Gaussian distribution (impulsive noise is small) if $\alpha$ is equal to or greater than 1.7. The determination reference of the parameter $\alpha$ is not limited to the numerical number and a predetermined threshold may be acquired by performing experiments or simulations.

The noise removal method selected in FIG. 6 is an adaptive filtering process in which an equation to be used changes so as to be available for each of the types of noise that is determined using the statistical parameters. The robust multi-reference noise removal unit 30 changes an equation to be used in the adaptive filtering process based on the result of selection in FIG. 6.

Figure 7:
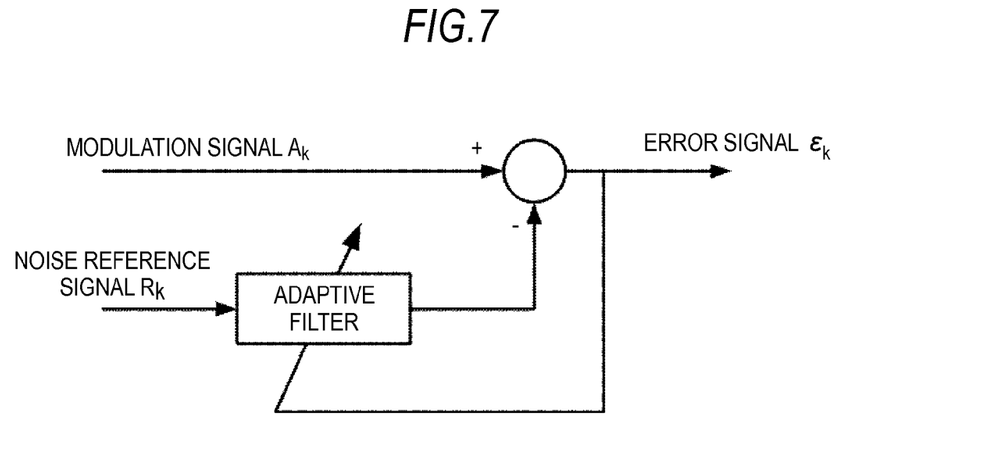
FIG. 7 is a conceptual view illustrating an adaptive filtering process in the robust multi-reference noise removal.

FIG. 7 is a conceptual view illustrating the adaptive filtering process in the noise removal method selected in FIG. 6. In the adaptive filtering process, a modulation signal $A_k$ and a noise reference signal $R_k$ are input, and a modulation signal, from which noise is removed, is output as an error signal $\epsilon_k$.

Each of the noise removal methods which are used for the robust multi-reference noise removal according to the embodiment will be described below. The noise removal methods are examples, and another arbitrary noise removal method which is available for each of the types of noise that is determined using the statistical parameters may be used.

LMS

When there is full-band coherence, noise is stationary and $\alpha$ is equal to or greater than 1.7, the LMS (Least Mean Square) algorithm is used.

Although the calculation cost of the LMS is low, Gaussian noise is premised. The robust multi-reference noise removal unit 30 performs noise removal using the following Expression (4) as the LMS algorithm.

$$\varepsilon_k(f) = A_k(f) - R_k(f)W_k(f) \quad (4)$$
$$W_k(f) = W_{k-1}(f) + \frac{\mu}{P_k}\varepsilon_k(f)R_k(f)$$
$$P_k(f) = \gamma P_{k-1} + (1-\gamma)R_K^T(f)R_k(f)$$

μ expresses step size. $W_k(f)$ is a filter update coefficient at the time point of k, $P_k(f)$ is the update coefficient of noise intensity which is smoothed for normalization.

Robust LMS

When there is full-band coherence, noise is stationary and α is less than 1.7, the Robust LMS algorithm is used.

When α is less than 1.7, impulsive noise is strong, and thus convergence properties are deteriorated in the LMS. Therefore, it is preferable to change the LMS to be robust so as to maintain convergence properties. Here, in the embodiment, a Least Mean P-norm (LMP) algorithm using Fractional Low Order Moments is applied to the LMS (this is referred to as Robust LMS).

The robust multi-reference noise removal unit 30 performs noise removal using the following Expression (5) as the Robust LMS algorithm.

$$\varepsilon_k(f) = A_k(f) - R_k(f)W_k(f) \quad (5)$$

$$W_k(f) = W_{k-1}(f) + \frac{\mu}{P_k} \langle \varepsilon_k(f) \rangle^{p-1} R_k(f)$$

$$P_k(f) = \gamma P_{k-1} + (1-\gamma)\|R_k(f)\|_p^p$$

μ expresses step size. $W_k(f)$ is a filter update coefficient at the time point of k, $P_k(f)$ is the update coefficient of the noise intensity which is smoothed for normalization. The meaning of symbols in Expression (5) is the same as in Expression (6).

$$\langle x \rangle^{p-1} = |x|^{p-1}\text{sign}(x) \quad (6)$$

$$\|x\|_p = \left(\sum_{i=1}^n |x_i|^p\right)^{\frac{1}{p}}$$

$$\text{sign}(x) = \begin{cases} 1 & \text{when } x > 0 \\ 0 & \text{when } x = 0 \\ -1 & \text{when } x < 0 \end{cases}$$

Although the Expression is the same as the LMS as a whole, a point is different in that the definition of $W_k(f)$ is changed so as to use the parameter α. p is the degree of the fractional low order moment and the parameter α which is calculated in the statistical parameter estimation is used, and thus 1<p<α<2. Although it is possible to appropriately establish the value of p, it is assumed that p=α−0.1 in the embodiment.

RLS

When there is full-band coherence, noise is not stationary and α is equal to or greater than 1.7, an RLS algorithm is used.

When noise is not stationary, it is difficult to perform removal in compliance with the change in noise in the LMS in which convergence is slow. Therefore, it is preferable to use an algorithm which enables fast convergence. Here, in the embodiment, the RLS (Recursive Least square) algorithm is used. Although the calculation cost of the RLS is high, various fast implementing methods are implemented and it is possible to use an arbitrary implementing method. In the embodiment, a Fast Transversal RLS which is a fast implementing method is used.

The robust multi-reference noise removal unit 30 performs noise removal using the following Expression (7) as the RLS algorithm.

$$W_k = W_{k-1} + G_k[A_k - R_k^T W_{k-1}] \quad (7)$$

$$G_k = \frac{C_{k-1}^{-1} R_k}{\delta + R_k^T C_{k-1}^{-1} R_k}$$

$$C_k^{-1} = \delta^{-1} C_{k-1}^{-1} - \delta^{-1} C_{k-1}^{-1} G_k R_k^T C_{k-1}^{-1}$$

$W_k$ is a channel vector at the time point of k. $A_k$ is an input vector at the time point of k. $R_k$ is a reference input vector. $C_k^{-1}$ is a covariance matrix. δ is a forgetting coefficient.

Robust RLS

When there is full-band coherence, noise is not stationary and α is less than 1.7, a robust RLS algorithm is used.

Since impulsive noise is strong when α is less than 1.7, the convergence properties are deteriorated in the RLS. Therefore, it is preferable to change the RLS to be robust so as to maintain the convergence properties. Here, in the embodiment, change which is similar to the Robust LMS is applied to the RLS (this is referred to as Robust RLS).

The robust multi-reference noise removal unit 30 performs noise removal using the following Expression (8) as the Robust RLS algorithm.

$$W_k = W_{k-1} + G_k[A_k - R_k^T W_{k-1}] \quad (8)$$

$$G_k = \frac{V_{k,k} C_{k-1}^{-1} R_k}{\delta + V_{k,k} R_k^T C_{k-1}^{-1} R_k}$$

$$C_k^{-1} = \delta^{-1} C_{k-1}^{-1} - \delta^{-1} C_{k-1}^{-1} G_k R_k^T C_{k-1}^{-1}$$

$$V_{i,k} = \frac{|A_i - R_i^T W_k|^p}{|A_i - R_i^T W_k|^2}$$

$W_k$ is a channel vector at the time point of k. $A_k$ is an input vector at the time point of k. $R_k$ is a reference input vector. $C_k^{-1}$ is a covariance matrix. δ is a forgetting coefficient. $V_{i,k}$ is a weight coefficient.

Although the Expression is the same as the RLS as a whole, a point is different in that the definition of $W_k$ is changed so as to use the parameter α. p is the degree of the fractional low order moment and the parameter α which is calculated in the statistical parameter estimation is used, and thus 1<p<α<2. Although it is possible to appropriately establish the value of p, it is assumed that p=α−0.1 in the embodiment.

Bounded LMS

When there is no full-band coherence, there is partial coherence and α is equal to or greater than 1.7, a Bounded LMS algorithm is used.

Since a signal is caused to be deteriorated when noise removal is performed to a portion in which there is no coherence, it is preferable to limit the target of the noise removal process to only a portion in which there is coherence (for example, an area in which the value of coherence is greater than 0.4). Here, in the embodiment, the application range of the LMS is limited using an integral window (this is referred to as Bounded LMS). The integral window includes a first window in which a coefficient is set to 1 in an area in which there is coherence and the coefficient is set to 0 in other areas, and a second window in which the coefficient is set to the reverse value thereof.

More specifically, the integral window is expressed in Expression (9).

$$W_{k,proc}(f) = \begin{cases} 1 & \text{frequency area in which coherence} > 0.4 \\ 0 & \text{the other frequency areas} \end{cases} \quad (9)$$

$$W_{k,notproc}(f) = \begin{cases} 1 & \text{frequency area in which coherence} \leq 0.4 \\ 0 & \text{the other frequency areas} \end{cases}$$

The first window $w_{k,proc}$ is used to show a section in which the noise removal process is performed, and the second window $w_{k,notproc}$ is used to show a section in which the noise removal process is not performed. As a result, the modulation signal $A_k$ and the noise reference signal $R_k$ are expressed in such a way that each of the signals are divided into the section in which the noise removal process is performed and the section in which the noise removal process is not performed using the following Expression (10).

$$A_{k,proc}(f) = w_{k,proc}(f) A_k(f)$$

$$A_{k,notproc}(f) = w_{k,notproc}(f) A_k(f)$$

$$R_{k,proc}(f) = w_{k,proc}(f) R_k(f)$$

$$R_{k,notproc}(f) = w_{k,notproc}(f) R_k(f) \quad (10)$$

If the LMS algorithm is applied to Expression (10), Expression (11) is acquired. The robust multi-reference noise removal unit 30 performs noise removal using Expression (11).

$$\varepsilon_{k,proc}(f) = A_{k,proc}(f) - R_{k,proc}(f) W_k(f) \quad (11)$$

$$W_k(f) = w_{k-1}(f) + \frac{\mu}{P_k} \varepsilon_{k,proc}(f) R_{k,proc}(f)$$

$$P_k(f) = \gamma P_{k-1} + (1 - \gamma) R_{k,proc}^T(f) R_{k,proc}(f)$$

Thereafter, the robust multi-reference noise removal unit 30 adds the modulation signal on which the noise removal process is not performed to the error signal on which the noise removal process is performed, thereby reconstructing a complete error signal (corresponding to the modulation signal acquired after noise removal is performed) using Expression (12).

$$\epsilon_k(f) = A_{k,notproc}(f) + \epsilon_{k,proc}(f) \quad (12)$$

It is possible to perform the noise removal process on only the frequency area in which there is coherence using the above-described methods.

Robust Bounded LMS

When there is no full-band coherence, there is partial coherence and $\alpha$ is less than 1.7, a Robust Bounded LMS algorithm is used.

Since impulsive noise is strong when $\alpha$ is less than 1.7, it is preferable to change the LMS to be robust so as to maintain the convergence properties. Here, in the embodiment, the expression is changed so as to use the parameter $\alpha$ as in the case of the Robust LMS, and thus the Bounded LMS is caused to be robust (this is referred to as Robust Bounded LMS).

The robust multi-reference noise removal unit 30 performs noise removal using Expression (13) as the Robust Bounded LMS algorithm.

$$\varepsilon_{k,proc}(f) = A_{k,proc}(f) - R_{k,proc}(f) W_k(f) \quad (13)$$

$$W_k(f) = w_{k-1}(f) + \frac{\mu}{P_k} \langle \varepsilon_{k,proc}(f) \rangle^{p-1} R_{k,proc}(f)$$

$$P_k(f) = \gamma P_{k-1} + (1 - \gamma) \|R_{k,proc}(f)\|_p^p$$

The meaning of symbols denoted in Expression (13) is the same as in Expressions (6), (9), and (10). Further, the robust multi-reference noise removal unit 30 adds the modulation signal, on which the noise removal process is not performed, to the error signal acquired after the noise removal process using Expression (12) in the same manner as the Bounded LMS, thereby reconstructing a complete error signal (corresponding to the modulation signal acquired after the noise removal is performed).

With the method, it is possible to perform the robust noise removal process in only the frequency area in which there is coherence.

The above-described robust multi-reference noise removal method is an example, and the embodiment disclosed here is not limited to the detailed branch conditions or the algorithms. Here, it is important to select an appropriate noise removal method based on the statistical parameters which include the parameter $\alpha$ and, further, it is important to perform the noise removal process using system parameters, and thus it is possible to implement the noise removal process which is available for various types of noise such as impulsive noise.

Main Antenna Process

When the robust multi-reference noise removal is not performed (for example, when the noise reference sensor 3 is not provided), the main antenna processing unit 40 performs noise removal on the modulation signal using the modulation signal received by the antenna 2 and the statistical parameters calculated by the statistical parameter estimation unit 20.

When the noise reference sensor is not provided, it is not possible to perform the above-described robust multi-reference noise removal using the noise reference signal. In this case, noise removal is performed using the main antenna process which does not use the noise reference signal.

Figure 8:
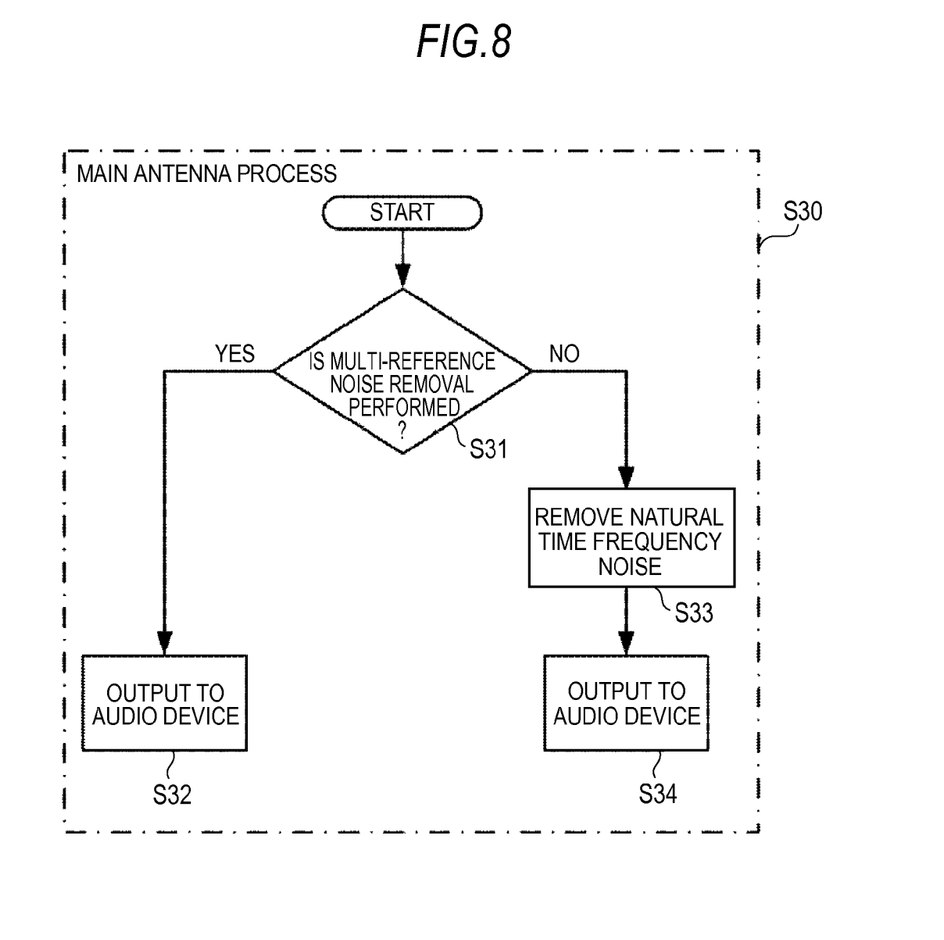
FIG. 8 is a flowchart illustrating a main antenna process according to the embodiment disclosed here.

FIG. 8 is a flowchart illustrating the main antenna process in step S30 according to the embodiment disclosed here. First, the main antenna processing unit 40 determines whether or not robust multi-reference noise removal is performed in step S31. More specifically, when it is determined that there is no partial coherence in step S25 of FIG. 6, information about the determination is transmitted to the main antenna processing unit 40, and thus it is possible to determine whether or not the robust multi-reference noise removal is performed.

When it is determined that the robust multi-reference noise removal is performed in step S31, the main antenna processing unit 40 outputs the modulation signal, acquired after the robust multi-reference noise removal is performed, to the audio device 4 without performing noise removal in the main antenna process in step S32. Further, in the audio device 4, the modulation signal is demodulated and is converted into the audio signal.

When it is determined that the robust multi-reference noise removal is not performed in step S31, the main antenna processing unit 40 performs natural time frequency noise removal in step S33.

A natural time frequency noise removal method will be described below. In the natural time frequency noise removal, a fractional low order moment based on the statistic of noise (parameter α) is used in order to cause the process to be robust. In the natural time frequency noise removal, the modulation signal from the antenna is projected into a sine base and a cosine base using the fractional low order moment, and thus impulsive noise is removed from the signal.

More specifically, the natural time frequency noise removal is performed using a method below. First, the main antenna processing unit 40 performs FFT after the modulation signal is multiplied by a window function (for example, a Hanning window function), and thus the modulation signal is converted into a frequency area. Subsequently, the main antenna processing unit 40 multiples amplitude by p-th power (fractional power) without operating the phase of the modulation signal on which the FFT is performed. Here, with regard to p, $1<p<\alpha<2$ using the parameter α which is calculated in the statistical parameter estimation. Although it is possible to appropriately establish the value of p, $p=\alpha-0.1$ in the embodiment. Finally, the main antenna processing unit 40 reconstructs the modulation signal in the temporal area using Inverse Fast Fourier Transform (IFFT) and an Overlap-add method or an Overlap-save method. The impulsive noise is removed from the reconstructed modulation signal.

If there is a method which enables temporal frequency analysis, Wigner distribution analysis (Wigner-DeVille method) may be used in addition to a short-time FFT method which is used in the embodiment.

Thereafter, the main antenna processing unit 40 outputs the modulation signal, which is acquired after the natural time frequency noise removal is performed, to the audio device 4 in step S34. Further, the modulation signal is demodulated and is converted into an audio signal in the audio device 4.

Audio Noise Removal

If the signal which is demodulated by the audio device 4 is received by the noise removal device 10, audio noise removal and distortion removal are performed as the post-processing. When there is a plurality of speakers, the audio signal is output to each of the speakers from the audio device 4, and thus the audio noise removal and the distortion removal are performed in parallel on each audio signal.

The audio noise removal unit 50 performs a threshold process on the audio signal based on the audio signal demodulated by the audio device 4 and the statistical parameters calculated by the statistical parameter estimation unit 20. In the embodiment, since the parameter α which expresses the distribution of noise is used for the threshold process, it is possible to effectively remove impulsive noise.

Figure 9:
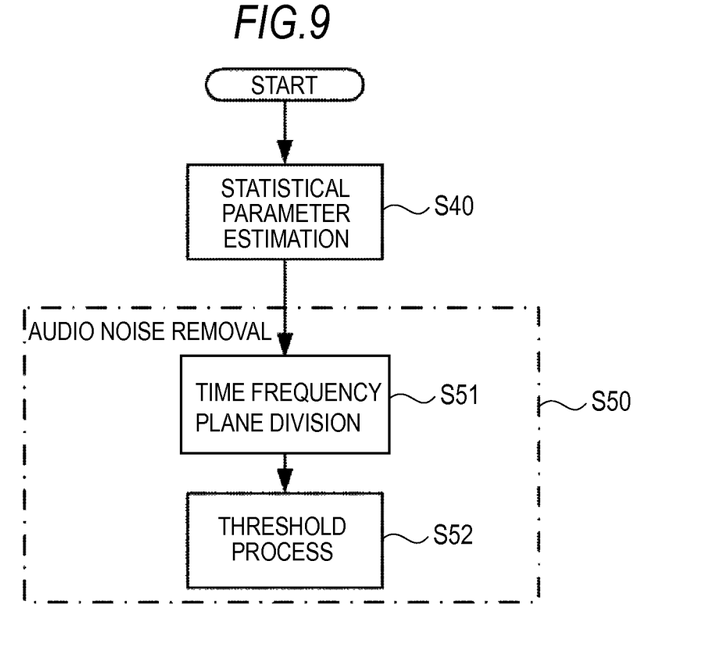
FIG. 9 is a flowchart illustrating audio noise removal according to the embodiment disclosed here.

FIG. 9 is a flowchart illustrating audio noise removal in step S50 according to the embodiment disclosed here. First, before the audio noise removal is performed, the statistical parameter estimation unit 20 performs statistical parameter estimation in step S40. The statistical parameter estimation which is performed in the post-processing is different from that of the pre-processing in that a predictive error signal is a target instead of the noise reference signal. A predictive error signal calculation method will be described below. First, the statistical parameter estimation unit 20 acquires an auto-correlation function for the audio signal using the following Expression (14).

$$R = \frac{1}{N-1} IFFT\{|FFT(x_{k,n})|^2\} \quad (14)$$

R is an auto-correlation signal. N is a length of FFT. $x_{k,n}$ is an audio signal which is directed toward an n-th speaker at the time point of k. The statistical parameter estimation unit 20 solves a Yule-Walker equation (for example, using Levinson-Durbin algorithm) in order to acquire a P-degree (P is a degree of a polynomial expression) linear predictive coefficient from the auto-correlation signal. Therefore, the statistical parameter estimation unit 20 estimates a P-degree linear predictive coefficient, and calculates the estimated signal using the following Expression (15).

$$\hat{x}(n) = -a(1)x(n-1) - a(2)x(n-2) - a(3)x(n-3) \ldots -a(p)x(n-p) \quad (15)$$

Further, the statistical parameter estimation unit 20 calculates a predictive error signal e(n) using the following Expression (16).

$$e(n) = x(n) - \hat{x}(n) \quad (16)$$

Since only the parameter α is necessary for audio noise removal, the statistical parameter estimation unit 20 performs only the noise distribution estimation in step S12 of FIG. 5 as the statistical parameter estimation in step S40 in the post-processing. The statistical parameter estimation unit 20 considers the predictive error signal e(n) as the noise reference signal, and calculates the parameter α in the post-processing using Expressions (2) and (3).

At the same time, the statistical parameter estimation unit 20 performs noise power calculation as the statistical parameter estimation in step S40 in the post-processing in order to determine a threshold. In the embodiment, the power of the noise reference signal acquired by the noise reference sensor 3 is used as the noise power.

When the noise reference sensor 3 is not provided, the parameter α is statistically calculated for each of the components which are included in the audio signal, and a component in which the parameter α is low is considered as noise. Therefore, it is possible to use the value of the sum of power of the components as the noise power.

Subsequently, the audio noise removal unit 50 performs temporal frequency plane division on the audio signal in step S51. When the temporal frequency plane division is performed, first, the audio noise removal unit 50 performs FFT after the received audio signal is multiplied by the window function (for example, the Hanning window function). Further, the audio noise removal unit 50 buffers M (for example, M=10) audio signals on which the FFT is performed.

Figure 10A:
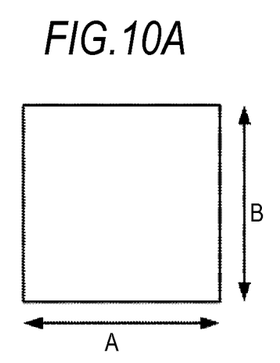
FIGS. 10A to 10D are views illustrating division methods performed on a temporal frequency plane.
Figure 10B:
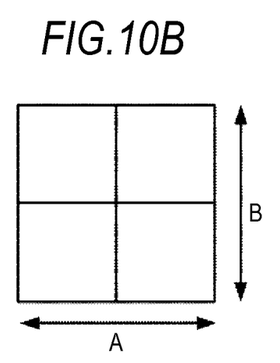
Figure 10C:
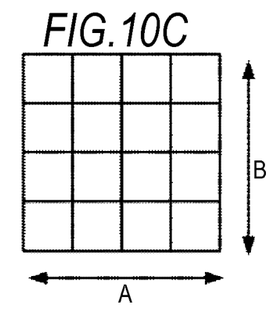
Figure 10D:
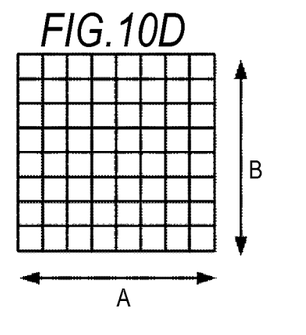

The audio noise removal unit 50 performs division on the audio signal on which the FFT is performed on the temporal frequency plane. Each of the areas obtained by performing the division is referred to as a grid. FIGS. 10A to 10D are views schematically illustrating division methods performed on the temporal frequency plane. FIG. 10A illustrates the distribution range of the audio signal on which the FFT is performed on a temporal axis and FIG. 10B illustrates the distribution range of the audio signal on which the FFT is performed on a frequency axis. Here, the audio noise removal unit 50 determines the number of divisions based on the parameter α. For example, division is not performed when $1.9<\alpha \leq 2.0$ (FIG. 10A), each axis is divided into two when $1.6<\alpha \leq 1.9$ (FIG. 10B), each axis is divided into four when $1.2<\alpha \leq 1.6$ (FIG. 10C), and each axis is divided into eight when $\alpha \leq 1.2$ (FIG. 10D).

The number of divisions and the conditions thereof are not limited to the above, and it is possible to appropriately establish the number of divisions and the conditions thereof by performing experiments or simulations.

The audio noise removal unit 50 performs the threshold process on the audio signal acquired by performing the temporal frequency plane division in step S52. The audio noise removal unit 50 determines a threshold based on the noise power which is calculated in advance in the statistical parameter estimation. Further, the audio noise removal unit 50 calculates the power of a signal at each grid. Thereafter, the audio noise removal unit 50 considers a grid which has power that is less than the threshold as noise, and sets the power of the signal in the grid to 0.

It is possible to use the correlation between different speakers in order to ensure that the grid, in which the power of the signal is set to 0, that is, the signal is cancelled, is actually noise. Actually, since audio signals are independent from each other between the channels of speakers and a noise source which contaminates the audio signal is shared, noise is strongly correlated between the channels.

If a grid is large when the impulsive noise is high (that is, $\alpha$ is small), noise is buried in a signal, and thus it is difficult to perform noise removal using the threshold process. Therefore, when $\alpha$ is small, it is easy to remove impulsive noise by performing fine division on the temporal frequency plane. On the other hand, when the impulsive noise is low (that is, $\alpha$ is great), the calculation cost is reduced by performing coarse division on the temporal frequency plane.

As described above, it is possible to perform noise removal which is appropriate for the type of noise by determining the number of divisions based on the parameter $\alpha$ and performing the threshold process.

In the embodiment, although the threshold process is used to perform noise removal on the audio signal, the embodiment disclosed here is not limited thereto if noise can be removed from the audio signal. For example, the robust multi-reference noise removal in step S20 may be applied to the audio signal. In this case, the statistical parameter estimation in step S10 is performed on the audio signal, and thus the statistical parameters are calculated. Subsequently, the robust multi-reference noise removal in step S20 is performed using the statistical parameters, and thus an appropriate adaptive filtering process is selected and executed.

Distortion Removal

After a series of noise removal which is described above is performed, an artifact (that is, artificial noise) may remain. Since it is possible to assume that long stationary components do not exist in the audio signal, it is possible to consider that such a component is interference to be removed (that is, distortion).

Figure 11:
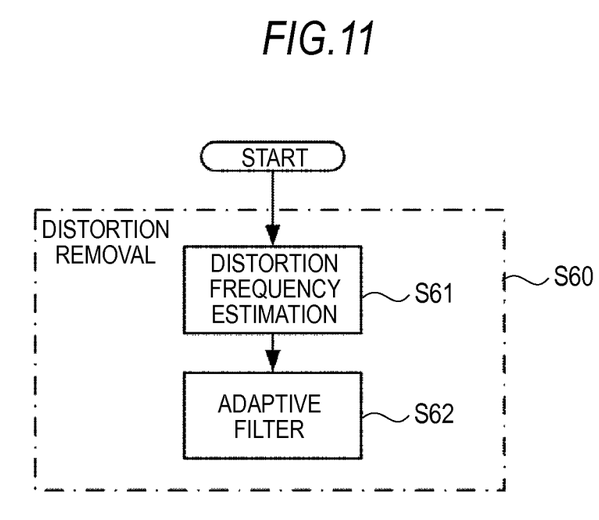
FIG. 11 is a flowchart illustrating distortion removal according to the embodiment disclosed here.

The distortion removal unit 60 performs distortion removal on the audio signal acquired after the audio noise removal is performed. FIG. 11 is a flowchart illustrating the distortion removal in step S60 according to the embodiment disclosed here. First, the distortion removal unit 60 performs distortion frequency estimation in step S61. In the embodiment, a distortion frequency is estimated using an ESPRIT method.

Before the ESPRIT method is performed, the distortion removal unit 60 applies a Huber function to an input audio signal in order to cause the estimation to be robust. The Huber function is expressed using the following Expression (17).

$$\tilde{x}_n = \begin{cases} x_n & \text{when } x_n \le K \\ \text{sign}[x_n]K & \text{when } x_n > K \end{cases} \quad (17)$$

The meaning of symbols in Expression (17) is the same as in Expression (6). $x_n$ is an audio signal of an n-th speaker. K is a clipping threshold and can be arbitrarily established. It is possible to reduce the influence of an outlier for the distortion frequency estimation using the filtering.

The ESPRIT method is a well-known method of estimating the frequency of an input signal. More specifically, first, the distortion removal unit 60 prepares a covariance matrix of the audio signals on which audio noise removal is performed. Subsequently, the distortion removal unit 60 performs Singular Value Decomposition (SVD) on the covariance matrix, and divides the covariance matrix into a signal subspace $U_s$ which is acquired by taking K rows in descending order of eigenvalues and a remaining noise subspace $U_n$. If it is assumed that a matrix which is acquired by taking first to (M−1)-th rows is $U_1$ and a matrix which is acquired by taking second to M-th row is $U_2$ in Us, it may be written that $U_2 = U_1 \Psi$. The distortion removal unit 60 performs eigenvalue decomposition on $\Psi$, and calculates estimated frequencies based on respective acquired eigenvalues.

The minimum estimated frequency of the estimated frequencies which are acquired by performing the distortion frequency estimation corresponds to a long stationary component, and the minimum estimated frequency is considered as distortion.

Figure 12:
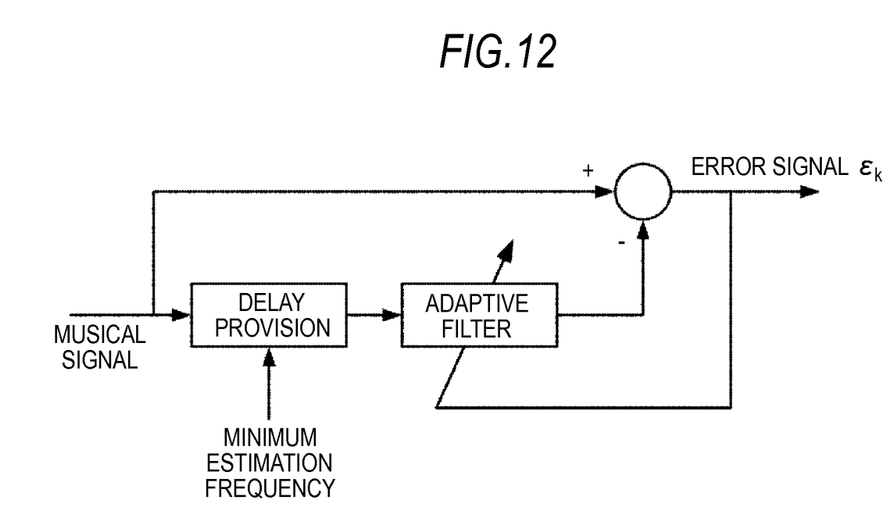
FIG. 12 is a conceptual view illustrating an adaptive filtering process in the distortion removal.

After the distortion frequency estimation ends, the distortion removal unit 60 performs an adaptive filtering process in step S62. FIG. 12 is a conceptual view illustrating the adaptive filtering process in distortion removal. In the adaptive filtering process, first, delay corresponding to the inverse number of the estimated frequency of the distortion (that is, a distortion period) is provided to the audio signal. Subsequently, the audio signal and the delayed audio signal are input to the adaptive filter, and an audio signal, from which distortion is removed, is output as an error signal. It is possible to use an arbitrary algorithm, such as the LMS, as the adaptive filter.

The audio signal, from which distortion is removed, is finally output to the speaker.

In the embodiment, it is possible to effectively remove noise from the modulation signal or the audio signal by changing an element which relates to the process of removing noise from the modulation signal or the audio signal depending on the parameter $\alpha$ which expresses the distribution of noise. That is, in the robust multi-reference noise removal in step S20, the noise removal method is selected according to the statistical parameters including the parameter $\alpha$, and, further, a part of an expression which is used for the adaptive filtering process is changed depending on the parameter $\alpha$. In addition, in the main antenna process in step S30, the parameter $\alpha$ is used for a calculation expression for the natural time frequency noise removal. Further, in the audio noise removal in step S50, the grid division in the threshold process is changed depending on the parameter $\alpha$.

As described above, the statistical parameters including the parameter $\alpha$ which expresses the distribution of noise are used for the noise removal, and thus it is possible to select an appropriate noise removal method depending on the type of noise. In addition, since it is possible to change the noise removal method to correspond to the type of noise, it is possible to effectively perform noise removal on various types of noise, particularly, impulsive noise.

This disclosure is not limited to the above-described embodiment and can be appropriately modified without departing from the gist of this disclosure.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A noise removal device which removes noise included in a signal, comprising:
    a statistical parameter calculation portion configured to calculate a parameter which expresses distribution of the noise based on the signal; and
    a noise removal portion configured to remove the noise from the signal by changing an element which relates to a process of removing the noise from the signal depending on the parameter which expresses the distribution of the noise;
    wherein the noise removal portion selects a noise removal method which is used to remove the noise from the signal based on the parameter which expresses the distribution of the noise;
    a noise reference sensor that is provided in a vicinity of a noise source which generates the noise in order to acquire a noise reference signal,
    wherein the statistical parameter calculation portion calculates the parameter which expresses the distribution of the noise, a parameter which expresses coherence between the signal and the noise reference signal, and a parameter which expresses stationarity of the noise based on the signal and the noise reference signal, and
    the noise removal portion selects the noise removal method which is used to remove the noise from the signal based on the parameter which expresses the distribution of the noise, the parameter which expresses the coherence, and the parameter which expresses the stationarity.

2. The noise removal device according to claim 1,
    wherein the noise removal portion removes the noise from the signal using a first noise removal method when the parameter which expresses the distribution of the noise is less than a predetermined value, and
    the noise removal portion removes the noise from the signal using a second noise removal method when the parameter which expresses the distribution of the noise is equal to or greater than the predetermined value.

3. A noise removal device which removes noise included in a signal, comprising:
    a statistical parameter calculation portion configured to calculate a parameter which expresses distribution of the noise based on the signal; and
    a noise removal portion configured to remove the noise from the signal by changing an element which relates to a process of removing the noise from the signal depending on the parameter which expresses the distribution of the noise;
    wherein the signal is a modulation signal which is acquired by modulating an audio signal, and
    the noise removal portion includes:
        a first noise removal portion configured to remove the noise from the modulation signal using the parameter which expresses the distribution of the noise; and
        a second noise removal portion configured to remove the noise from the audio signal which is acquired by demodulating the modulation signal using the parameter which expresses the distribution of the noise.

* * * * *